2,803,677

DEHYDROCHLORINATION OF 1,1-DICHLORO-ETHANE AND 1,1,1-TRICHLOROETHANE

Clarence M. Neher and James H. Dunn, Baton Rouge, La., assignors to Ethyl Corporation, New York, N. Y., a corporation of Delaware No Drawing. Application June 28, 1954, Serial No. 439,864

4 Claims. (Cl. 260—656)

This invention relates to a dehydrochlorination process and more particularly to a new and improved process for the catalytic dehydrochlorination of 1,1-dichloroethane or 1,1,1-trichloroethane to produce vinyl chloride or vinylidene chloride, respectively.

In recent years, the chloroethylenes, especially vinyl chloride and vinylidene chloride, have become important and valuable commercial products, particularly as a polymeric material. The most commonly used commercial methods today for their manufacture are (1) the hydrochlorination of acetylene to form vinyl chloride and (2) the pyrolytic dehydrochlorination of 1,2-dichloroethane or 1,1,2-trichloroethane to form vinyl chloride or vinylidene chloride. In the manufacture of vinyl chloride, the dehydrochlorination process is inherently more economical than the acetylene hydrochlorination process because ethylene is employed as a raw material rather than acetylene.

The polychloroethanes employed in the dehydrochlorination processes above are presently produced by the chlorination of ethylene which produces, almost quantitatively, the desired 1,2-dichloroethane and 1,1,2-trichloroethane isomer, and essentially no 1,1-dichloroethane or 1,1,1-trichloroethane isomer. Polychloroethanes can be produced by the chlorination of ethane, a much cheaper raw material than ethylene, but the process produces a preponderance of the presently undesired monomethylpolychloromethane isomer; e. g., 1,1-dichloroethane and 1,1,1-trichloroethane.

While it is known that these chloroethylenes can be made by the vapor phase pyrolytic dehydrochlorination of either of the respective polychloroethane isomers, the reaction rate using the monomethyl polychloromethane isomer is relatively slow even at very high temperatures. Although catalytic pyrolysis of 1,2-dichloroethane or 1,1,2-trichloroethane has been known, no suitable catalyst is known for the dehydrochlorination of the monomethylpolychloromethane isomer to either vinyl chloride or vinylidene chloride. Accordingly, these cheap sources of raw materials, the monomethylpolychloromethanes, have never been used commercially for the manufacture of vinyl chloride or vinylidene chloride.

It is accordingly an object of the present invention to provide an improved process for the economical manufacture of vinyl chloride and/or vinylidene chloride. Another object of the present invention is the provision of a more efficient dehydrochlorination process using 1,1-dichloroethane or 1,1,1-trichloroethane and particularly one which is operable at moderate temperatures. A still further object is the provision of a process of the above type which will preferentially dehydrochlorinate 1,1-dichloroethane in the presence of the 1,2-dichloroethane isomer, thus permitting the recovery of the valuable 1,2-dichloroethane as a relatively pure coproduct. Other and further objects and advantages of this invention will be apparent from the following description.

It has now been found that 1,1-dichloroethane and 1,1,1-trichloroethane can be dehydrochlorinated to produce vinyl chloride and vinylidene chloride, respectively, if the reaction is conducted in the presence of activated alumina and at a temperature between about 150° and about 500° C. Under these conditions, the reaction proceeds at an unexpectedly high rate to form the desired chloroethylene.

This is particularly surprising because the 1,1-dichloroethane isomer has a slower dehydrochlorination rate than the 1,2-dichloroethane isomer with prior known processes, and, as shown in U. S. Patent 2,412,308, activated alumina has a deleterious effect on the degree of conversion of the 1,2-dichloroethane isomer to vinyl chloride. In fact, it has also been found that the 1,1-dichloroethane can actually be selectively dehydrochlorinated in the presence of the 1,2-dichloroethane isomer. This behavior is wholly unexpected since in prior processes the reaction rate of 1,2-dichloroethane is as much as 300 percent greater than that of 1,1-dichloroethane. The present invention, therefore, also provides a process whereby the two dichloroethane isomers can be separated if desired and the valuable 1,2-dichloroethane recovered as a separate coproduct with the vinyl chloride. Heretofore, because of close physical and chemical properties, this isomer separation has been a difficult and costly operation.

Activated alumina has the further advantage of being a relatively cheap catalyst which can be used for long periods without losing its catalytic properties.

In practice, the process of the present invention comprises passing a gaseous feed stream of either 1,1-dichloroethane, 1,1,1-trichloroethane, or a mixture of 1,1-dichloroethane and 1,2-dichloroethane through a heated reaction zone, such as a tube reactor, in intimate contact with the activated alumina catalyst. The dehydrochlorination proceeds smoothly and rapidly so as to convert a considerable amount of the monomethylpolychloromethane reactant material to the desired vinyl chloride or vinylidene chloride. The product mixture is withdrawn from the reaction zone and can be passed directly to a condenser, thereby recovering the condensable materials and allowing the hydrogen chloride formed in the reaction to pass overhead to a recovery system. Alternatively, the product gases from the reaction zone can be passed through a hydrogen chloride recovery system, prior to condensing the higher boiling chloroethylenes and unreacted feed stock. The chloroethylene and any 1,2-dichloroethane present can then be recovered from the condensate, such as by fractional distillation. If desired, unreacted 1,1-dichloroethane or 1,1,1-trichloroethane can be recycled to the reaction zone in order to obtain a more complete conversion of feed material to the desired product.

The activated alumina is normally employed in particle sizes of between about 3 and about 250 mesh. When it is desired to use a packed type of reactor, the activated alumina usually will be present in the form of particles of a size small enough to provide large surface areas for maximum contact with the reactant gases. For use in this type of reactor, it has been found that a particle size of from about 3 to 12 mesh size is very satisfactory; 6 to 10 mesh being a preferred size. In one embodiment of the present invention, the catalyst bed can be of the fluid bed type. While the particle size is not especially critical in this type of operation, it is important and it is normal to employ a fluidizing media having an average particle size between about 50 to 250 mesh and preferably between 100 and 200 mesh. Particles much less than 250 mesh are sometimes suitable for a fluidized bed reaction but such particles tend to be entrained with the product vapors, whereas particles having a diameter above 50 mesh result in mechanical difficulties in the fluidization technique.

The fluidized bed can be of a conventional type employing any suitable fluidizing means and can utilize any desired temperature controlling means, either internal or external. When desired, however, the catalyst can be removed from the reaction zone and easily regenerated by techniques well known to those skilled in the art.

In general, it is suitable to use pure 1,1-dichloroethane or 1,1,1-trichloroethane feed material in the process so as to obtain maximum benefits of the present invention. However, when desired, it is sometimes preferred to employ a feed stream having other alkanes or chlorinated alkanes therein, such for example as 1,2-dichloroethane. In the latter case, it has been found that this component does not react during the concomitant dehydrochlorination of the 1,1-dichloroethane or 1,1,1-trichloroethane, although this behavior is extremely surprising for the reasons presented above.

The reaction rate is dependent upon temperature but it has been found that temperatures as low as about 150° C. and as high as about 500° C. can be employed to effect the desired reaction. Temperatures below 150° C. tend to give slow reaction rates and uneconomically low conversions. Temperatures above 500° C., in contrast to prior processes, result in excessive degradation of the product, thereby forming carbon and resulting in reduced conversions. Further, when operating at temperatures between about 400° C. and about 500° C., it is possible, when desired to effectively and efficiently dehydrochlorinate both the 1,1-dichloroethane isomer and the 1,2-dichloroethane isomer to produce the desired vinyl chloride. However, when it is desired to preferentially dehydrochlorinate the 1,1-dichloroethane isomer or the 1,1,1-trichloroethane isomer, the reaction temperature is maintained between about 200° and 400° C. and in the preferred embodiment of this invention, between 250° C. and 350° C. to produce optimum yields, conversions, and purity of product.

A wide range of pressures are suitable for this invention. In many cases atmospheric pressure is desirable and has the advantage of eliminating expensive pressurized equipment. The reaction, however, can be carried out at superatmospheric or subatmospheric pressure, the choice of pressure operation normally being determined by the nature of the prior treatment of the starting material or subsequent treatment of the reaction product.

The reaction or contact time is important. The space velocity of the gaseous material passing through the reaction zone can be controlled to obtain the necessary contact time between reactant and catalyst to promote the desired dehydrochlorinaion reaction. In general, the most advantageous contact period is dependent upon several variables, such as the scale of the operation, quantity of catalyst in the reactor and the type of reactor employed. For most reactors, it has been found that a contact time of as high as about 25 seconds and as low as 0.5 second is suitable for the present process. With a contact time below about 0.5 second, the product frequently contains considerable quantities of unreacted feed material. Above about 25 seconds, the impurities tend to increase and the product becomes more difficult to recover in a pure form.

Various process equipment are suitable for use with the present invention. These can be constructed of any of a large number of common and inexpensive materials. This is in contrast to prior processes requiring costly alloys for high temperature operation. Thus, this process can be conducted in iron or ferrous metal reactors without excessive corrosion of the reactor walls.

The following examples describe typical embodiments of this process and are given to illustrate the invention in more detail. All quantities in these examples are given in parts by weight.

EXAMPLE I

This example illustrates one embodiment of the present invention wherein the reaction is conducted in a fixed-bed type of reactor. A liquid 1,1-dichloroethane feed stream was fed to a vaporizer and the resultant vapors were passed through a heated reactor tube packed with activated alumina. The feed rate was regulated so as to permit a contact time of about 7.8 seconds and a reaction temperature of about 300° C. The conversion of 1,1-dichloroethane to vinyl chloride was 78.0 percent.

In a comparative run in which the feed material was 1,2-dichloroethane, conditions being otherwise the same as above, no reaction was obtained, all of the feed material being recovered in an unreacted form.

Table I is a summary of the comparative results obtained in this example. The reaction velocity constant K, a measure of the reaction rates of the two feed materials, was calculated from the following formula and is expressed in reciprocal seconds.

$$K = 1/t.2.3 \log (100/100 - \text{percent conversion})$$

*Table I*

| Catalyst | Feed Material | Feed Rate (Moles per hr.) | Reactor Temperature (°C.) | Conversion to $C_2H_3Cl$ (percent) | Contact Time (sec.) | K (sec.$^{-1}$) |
| --- | --- | --- | --- | --- | --- | --- |
| Alumina | 1,1-$C_2H_4Cl_2$ | 8.0 | 300 | 78.0 | 7.8 | .19 |
| Do | 1,2-$C_2H_4Cl_2$ | 8.0 | 300 | 0.0 | 7.8 | .00 |

From these results, the high reaction rate and degree of conversion of the 1,1-dichloroethane to vinyl chloride at the moderate reaction temperature employed therein are clearly evident. Also to be noted is the highly selective nature of the dehydrochlorination process with respect to the organic feed material under these conditions, the 1,2-dichloroethane being completely unreacted.

EXAMPLE II

This is a comparative example which demonstrates the unreactiveness of the 1,1-dichloroethane in the absence of activated alumina, even at temperatures as high as 500° C., and, under these same conditions, the relative reactiveness of 1,2-dichloroethane, the latter having a rate about 6 times as fast as the 1,1-dichloroethane.

Table II summarizes the results obtained when the procedure of Example I was repeated, except that the reaction zone did not contain any catalytic material and the reaction conditions were varied as shown in the following table.

*Table II*

| Catalyst | Feed Material | Feed Rate (Moles per hr.) | Reactor Temperature (°C.) | Conversion to $C_2H_3Cl$ (percent) | Contact Time (sec.) | K (sec.$^{-1}$) |
| --- | --- | --- | --- | --- | --- | --- |
| None | 1,1-$C_2H_4Cl_2$ | 7.3 | 500 | 7.0 | 3.0 | 0.02 |
| None | 1,2-$C_2H_4Cl_2$ | 6.7 | 500 | 29.1 | 2.6 | 0.12 |

It should be noted in comparison with Example I, that the dehydrochlorination rate of the 1,1-dichloroethane in the absence of a catalyst and even at elevated temperatures is only about 1/10 that of the present invention, conducted at a materially lower temperature.

EXAMPLE III

This example illustrates another embodiment of the present invention wherein a fluidized bed type reactor was advantageously employed. The same feed system and recovery system employed in the process of Examples I and II were used in this example. However, the reactor contained finely divided particles of activated alumina which were maintained in a fluidized state by the flow of the reactant gases. The particle size of the activated alumina in the reaction zone ranged between about 50 and 250 mesh, with an average particle size of about 150 mesh in size. Liquid 1,1-dichloroethane was vaporized and the vapors were passed through the fluidized-bed reaction zone at a rate which permitted a reactant-catalyst contact time of about 6.6 seconds at the reaction temperature.

A comparative run was also made employing the same conditions but using 1,2-dichloroethane, instead of 1,1-dichloroethane, as the feed material, even using a longer contact time. The results of these runs are shown in Table III.

*Table III*

| Catalyst | Feed Material | Feed Rate (Moles per hr.) | Reactor Temperature (°C.) | Conversion to $C_2H_3Cl$ (percent) | Contact Time (sec.) | K (sec.$^{-1}$) |
|---|---|---|---|---|---|---|
| Alumina | 1,1-$C_2H_4Cl_2$ | 4.4 | 300 | 63.2 | 6.6 | 0.15 |
| Do | 1,1-$C_2H_4Cl_2$ | 3.8 | 350 | 69.0 | 6.2 | 0.19 |
| Do | 1,2-$C_2H_4Cl_2$ | 3.2 | 300 | 0.0 | 11.7 | 0.00 |
| Do | 1,2-$C_2H_4Cl_2$ | 3.2 | 400 | 10.0 | 7.9 | 0.01 |

Excellent conversions of the 1,1-dichloroethane to vinyl chloride at exceptionally high reaction rates are obtained in those runs employing the process of the present invention. It should also be noted that when 1,2-dichloroethane was employed as the feed material no appreciable dehydrochlorination of the dichloroethane was obtained, even at temperatures as high as 400° C.

EXAMPLE IV

This example illustrates still another embodiment of the present invention wherein 1,1,1-trichloroethane was readily converted to vinylidene chloride by our improved process. The procedure of Example III was repeated employing 1,1,1-trichloroethane instead of 1,1-dichloroethane as the feed material. Gaseous 1,1,1-trichloroethane was passed through the fluidized bed reaction zone at a flow rate which permitted a contact time of about 7.2 seconds at a temperature of about 250° C. The conversion of 1,1,1-trichloroethane to vinylidene chloride was 95.8 percent. In a comparative run, wherein a feed material of 1,1,2-trichloroethane was employed, the conversion was only 22.2 percent, even though a longer contact time and a higher reaction temperature was employed. The results of these runs are shown in Table IV.

*Table IV*

| Catalyst | Feed Material | Feed Rate (Moles per hr.) | Reactor Temperature (°C.) | Conversion to $C_2H_3Cl$ (percent) | Contact Time (sec.) | K (sec.$^{-1}$) |
|---|---|---|---|---|---|---|
| Alumina | 1,1,1-$C_2H_3Cl_3$ | 3.6 | 250 | 95.8 | 7.2 | 1.27 |
| Do | 1,1,2-$C_2H_3Cl_3$ | 3.3 | 350 | 22.2 | 10.8 | 0.02 |

It is apparent from the preceding description and examples that the present invention provides an improved economical process for efficiently dehydrochlorinating a cheap raw material, the monomethylpolychloromethanes, to a chloroethylene. The process comprises subjecting 1,1-dichloroethane or 1,1,1-trichloroethane to a temperature of between about 150° and about 500° C. and in the presence of activated alumina and recovering vinyl chloride or vinylidene chloride from the product. The process also permits the selective dehydrochlorination of 1,1-dichloroethane in the presence of the 1,2-dichloroethane isomer, thereby permitting the recovery of the valuable 1,2-dichloroethane as a relatively pure coproduct. Likewise, this process allows the recovery of 1,1,2-trichloroethane from a mixture also containing 1,1,1-trichloroethane.

We claim:

1. A process for the manufacture of a chloroethylene which comprises contacting a polychloroethane of the group consisting of 1,1-dichloroethane and 1,1,1-trichloroethane with activated alumina at a temperature of from about 150° to about 500° C. and recovering the chloroethylene therefrom.

2. The process of claim 1 wherein the polychloroethane is 1,1-dichloroethane and the chloroethylene produced is vinyl chloride.

3. The process of claim 1 wherein a temperature is employed from about 150° to about 400° C.

4. The process for making vinyl chloride which comprises passing a gaseous stream containing 1,1-dichloroethane in contact with a fluidized mass of activated aluminum particles in a reaction zone maintained at a temperature of from about 150° to 500° C. and recovering said vinyl chloride from the reaction products.

References Cited in the file of this patent

UNITED STATES PATENTS

| 2,183,036 | Amos | Dec. 12, 1939 |
| 2,412,308 | Weiler | Dec. 10, 1946 |
| 2,569,923 | Cheney | Oct. 2, 1951 |
| 2,628,259 | Dirstine et al. | Feb. 10, 1953 |
| 2,676,997 | Brown et al. | Apr. 27, 1954 |
| 2,725,411 | Ladd et al. | Nov. 29, 1955 |